US010612796B2

(12) United States Patent
Göransson

(10) Patent No.: US 10,612,796 B2
(45) Date of Patent: Apr. 7, 2020

(54) HEATING INSTALLATION

(71) Applicant: Energy Machines S.A., Luxembourg (LU)

(72) Inventor: Hans-Göran Göransson, Sliema (MT)

(73) Assignee: Energy Machines ApS, Faaborg (DK)

( * ) Notice: Subject to any disclaimer, the term of this patent is extended or adjusted under 35 U.S.C. 154(b) by 356 days.

(21) Appl. No.: 15/524,917

(22) PCT Filed: Nov. 6, 2015

(86) PCT No.: PCT/EP2015/075929
§ 371 (c)(1),
(2) Date: May 5, 2017

(87) PCT Pub. No.: WO2016/075044
PCT Pub. Date: May 19, 2016

(65) Prior Publication Data
US 2018/0156474 A1    Jun. 7, 2018

(30) Foreign Application Priority Data

Nov. 10, 2014    (SE) ........................................ 1451342

(51) Int. Cl.
*F24D 19/10*    (2006.01)
*F25B 25/00*    (2006.01)
(Continued)

(52) U.S. Cl.
CPC ........... *F24D 19/1072* (2013.01); *F24D 3/02* (2013.01); *F24D 3/08* (2013.01); *F24D 3/18* (2013.01);
(Continued)

(58) Field of Classification Search
None
See application file for complete search history.

(56) References Cited

U.S. PATENT DOCUMENTS 4,012,920 A * 3/1977 Kirschbaum ............. F24F 5/00
                                                    62/235.1
4,507,938 A * 4/1985 Hama ................. F24D 11/0214
                                                    62/324.1
(Continued)

FOREIGN PATENT DOCUMENTS

CN    102927606 A    2/2013
EP    2 402 683 A1   1/2012
(Continued)

*Primary Examiner* — Steven B McAllister
*Assistant Examiner* — John E Bargero
(74) *Attorney, Agent, or Firm* — Dilworth & Barrese, LLP

(57) ABSTRACT

A heating installation comprising: a first circuit (C1); a second circuit (C2); a first heat pump (4) for heating the medium in the first circuit; a heat exchanger (10) which is arranged in the second circuit and connected between a condenser (4b) and an expansion valve (4d) of the first heat pump; second and third heat pumps (11, 13) arranged for heating a medium by absorbing heat energy from the medium in the second circuit; and an accumulator tank (12) arranged in the second circuit downstream of the second heat pump (11). The accumulator tank is connected to an evaporator (13a) of the third heat pump (13) in order to allow medium to circulate between the accumulator tank and this evaporator so that heat exchange between the medium in the second circuit and a working medium of the third heat pump is possible via the evaporator of the third heat pump.

14 Claims, 6 Drawing Sheets

(51) Int. Cl.
*F25B 30/02* (2006.01)
*F25B 7/00* (2006.01)
*F24D 3/18* (2006.01)
*F24D 3/08* (2006.01)
*F24D 3/02* (2006.01)
*F25B 6/04* (2006.01)

(52) U.S. Cl.
CPC .............. *F25B 7/00* (2013.01); *F25B 25/005* (2013.01); *F25B 30/02* (2013.01); *F24D 2200/12* (2013.01); *F24D 2200/123* (2013.01); *F25B 6/04* (2013.01); *F25B 2339/047* (2013.01); *Y02B 30/12* (2013.01)

(56) References Cited

U.S. PATENT DOCUMENTS 8,037,931 B2 * 10/2011 Penev ................. F24D 17/0021
                                                                165/201
2008/0196431 A1 * 8/2008 Goransson ................ F24D 3/18
                                                                62/238.6

FOREIGN PATENT DOCUMENTS

JP       2008-298407 A    12/2008
WO     2006/057594 A1    6/2006

* cited by examiner

HEATING INSTALLATION

FILED OF THE INVENTION AND PRIOR ART

The present invention relates to a heating installation according to the description herein.

A heating installation according to the preamble of claim 1 is previously known from the patent document WO 2006/057594 A1. The heating installation disclosed in WO 2006/057594 A1 comprises a first heat pump for heating a medium in a first circuit. A heat exchanger connected between the condenser and the expansion valve of the first heat pump is used for transferring heat from the working medium of the heat pump to a medium in a second circuit, wherein a second heat pump is arranged for heating a medium by absorbing heat energy from the medium in the second circuit.

OBJECT OF THE INVENTION

The object of the present invention is to achieve a further development of a heating installation of the type described above in order to provide a heating installation with a configuration which in at least some aspect offers an advantage as compared to this previously known heating installation.

SUMMARY OF THE INVENTION

According to the invention, said object is achieved by means of a heating installation having the features defined herein.

The heating installation according to the invention comprises:
- a first circuit containing a medium;
- a second circuit containing a medium;
- a first heat pump arranged for heating the medium in the first circuit;
- a heat exchanger which is arranged in the second circuit and which is connected between a condenser and an expansion valve of the first heat pump in order to transfer heat from a working medium of the first heat pump to the medium in the second circuit;
- a second heat pump arranged for heating a medium by absorbing heat energy from the medium in the second circuit, wherein the second heat pump has its input side connected to the second circuit so that heat exchange between the medium in the second circuit and a working medium of the second heat pump is possible via an evaporator of the second heat pump;
- an accumulator tank, here denominated first accumulator tank, which is arranged in the second circuit for accumulating the medium in the second circuit, wherein this accumulator tank is arranged in the second circuit downstream of the second heat pump as seen in a flow direction from an outlet of said heat exchanger to an inlet thereof; and
- a third heat pump arranged for heating a medium by absorbing heat energy from the medium in the second circuit.

The first accumulator tank is connected to an evaporator of the third heat pump in order to allow medium to circulate between the first accumulator tank and the evaporator of the third heat pump so that heat exchange between the medium in the second circuit and a working medium of the third heat pump is possible via the evaporator of the third heat pump.

The above-mentioned heat exchanger constitutes a so-called subcooler of the first heat pump and is used in order to transfer heat form the working medium of the first heat pump to the medium in the second circuit, wherein the second heat pump is arranged to utilize heat energy from the medium in the second circuit in order to satisfy desired heating demands. Hereby, surplus heat of the working medium of the first heat pump may be utilized for suitable heating purposes instead of being wasted, and an increase of the efficiency of the first heat pump is obtained.

In the heating installation according to the invention, the third heat pump can be used in co-operation with the first accumulator tank in order to ensure that the temperature of the medium in the second circuit has been lowered to a temperature within a predetermined temperature interval before this medium is returned to said heat exchanger. Furthermore, rapid changes in the temperature of the medium return to the heat exchanger are prevented by means of the first accumulator tank. Therefore, the operation of the second heat pump does not have to be adapted focused on the attainment of a given temperature reduction of the medium in the second circuit. The operation of the second heat pump may instead be adapted with primary focus on an efficient energy recovery. The second heat pump may consequently be operated in an essentially optimal manner with respect to energy recovery. The solution according to the invention makes it possible to ensure in a simple manner, by means of the third heat pump and the first accumulator tank, to ensure a desired cooling of the medium in the second circuit before the medium is conveyed into said heat exchanger, which in its turn makes it possible for the heat exchanger to achieve an efficient subcooling of the working medium of the first heat pump, at the same time as heat energy of the medium in the second circuit can be utilized in an essentially optimal manner by means of the second heat pump.

Other favourable features of the heating installation according to the invention will appear from the description following below.

BRIEF DESCRIPTION OF THE DRAWINGS

The invention will in the following be more closely described by means of embodiment examples, with reference to the appended drawings. It is shown in.

DETAILED DESCRIPTION OF EMBODIMENTS OF THE INVENTION

Figure 1:
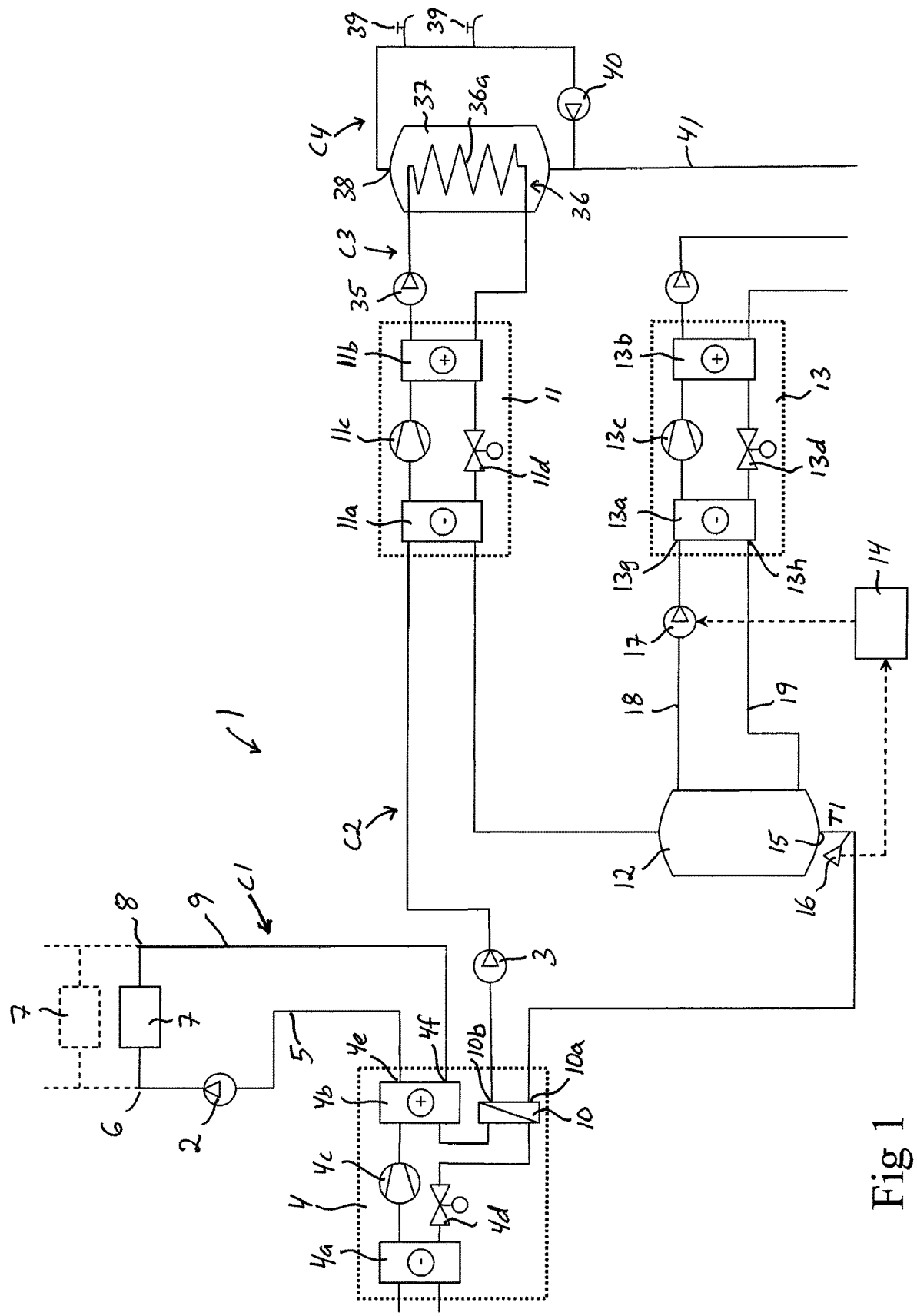
FIG. 1 a schematic illustration of a heating installation according to a first embodiment of the present invention, FIG. 2 a schematic illustration of a heating installation according to a second embodiment of the invention, FIG. 3 a schematic illustration of a heating installation according to a third embodiment of the invention, FIG. 4 a schematic illustration of a heating installation according to a fourth embodiment of the invention, FIG. 5 a schematic illustration of a heating installation according to a fifth embodiment of the invention, and FIG. 6 a schematic illustration of a heating installation according to a sixth embodiment of the invention.

Different embodiments of a heating installation 1 according to the invention are schematically illustrated in FIGS. 1-6. The illustrated heating installations are configured for heating a house or other building and tap hot-water associated therewith. However, the heating installation according to the invention may also be configured for satisfying other types of heating demands.

The heating installation 1 according to the invention comprises a first circuit C1 and a second circuit C2, each of which containing a liquid medium, such as for instance water. A circulation pump 2 is arranged in the first circuit C1 for circulating the medium in this circuit. A circulation pump 3 is also arranged in the second circuit C2 for circulating the medium in this circuit.

The heating installation 1 comprises a first heat pump 4 which is arranged for heating the medium in the first circuit C1, for instance by utilizing geothermal heat, ground heat and/or solar heat. The first heat pump 4 comprises an evaporator 4a, a condenser 4b, a compressor 4c and an expansion valve 4d, preferably an electromechanical expansion valve. By heat exchange with a medium in a circuit, here not shown, connected to the evaporator 4a, the working medium of the heat pump absorbs heat energy via the evaporator 4a. Work is added via the compressor 4c, whereby the pressure and the temperature of the working medium is increased. In the condenser 4b, heat energy is then emitted to the medium in the first circuit C1 by heat exchange and the working medium of the heat pump is then returned to the evaporator 4a via the expansion valve 4d, the pressure and the temperature of the working medium being lowered when passing the expansion valve. The heat pump 4 has its output side connected to the first circuit C1 so that heat exchange between the working medium of the heat pump and the medium in the first circuit C1 is possible via the condenser 4b of the heat pump.

An outlet 4e of the condenser 4b of the first heat pump is by means of a feeding conduit 5 connected to the inlet 6 of one or more heat emitting devices 7. These devices 7 are used for heating a further medium, in this case the air within the building, and are for instance constituted by conventional radiators to be operated with hot-water or other medium. The outlet 8 of the heat emitting devices is by means of a return conduit 9 connected to an inlet 4f of the condenser 4b of the first heat pump.

The heating installation 1 according to the invention further comprises a heat exchanger 10 which is arranged in the second circuit C2 and connected between the condenser 4b and the expansion valve 4d of the first heat pump 4 in order to transfer heat from the working medium of the first heat pump 4 to the medium in the second circuit C2. According to the invention, the condensate of the first heat pump 4 is consequently utilized in order to supply heat energy to the medium in the second circuit C2. The heat exchanger 10 constitutes a so-called subcooler of the first heat pump 4. The heat exchanger 10 has a primary circuit through which the working medium of the first heat pump 4 is arranged to flow, and a secondary circuit which, via an inlet 10a and an outlet 10b of this secondary circuit, is connected to the second circuit C2 in order to allow the medium in the second circuit C2 to flow through the secondary circuit.

The heating installation 1 according to the invention further comprises a second heat pump 11 which is arranged for heating a medium by absorbing heat energy from the medium in the second circuit C2. The second heat pump 11 comprises an evaporator 11a, a condenser 11b, a compressor 11c and an expansion valve 11d, preferably an electromechanical expansion valve. By heat exchange with the medium in the second circuit C2 connected to the evaporator 11a, the working medium of the second heat pump absorbs heat energy via the evaporator 11a. Work is added via the compressor 11c, whereby the pressure and the temperature of the working medium of the second heat pump is increased. In the condenser 11b, heat energy is then emitted to another medium by heat exchange and the working medium of the second heat pump is then returned to the evaporator 11a via the expansion valve 11d, the pressure and the temperature of the working medium being lowered when passing the expansion valve. The second heat pump 11 has its input side connected to the second circuit C2 so that heat exchange between the medium in the second circuit C2 and the working medium of the second heat pump is possible via the evaporator 11a of the second heat pump. In the illustrated embodiments, the second heat pump 11 is arranged to emit heat energy for final heating of tap hot-water and/or in order to give an addition of heat to the medium in the first circuit C1. However, the second heat pump 11 could as an alternative be arranged to emit heat energy for another heating purpose.

The heating installation 1 comprises a first accumulator tank 12 arranged in the second circuit C2 for accumulating the medium in the second circuit, wherein this accumulator tank 12 is arranged in the second circuit C2 downstream of the second heat pump 11 as seen in a flow direction from an outlet 10b of said heat exchanger 10 to an inlet 10a thereof.

The heating installation 1 according to the invention also comprises a third heat pump 13 arranged for heating a medium by absorbing heat energy from the medium in the second circuit C2. The third heat pump 13 comprises an evaporator 13a, a condenser 13b, a compressor 13c and an expansion valve 13d, preferably an electromechanical expansion valve. The first accumulator tank 12 is connected to the evaporator 13a in order to allow medium to circulate between the first accumulator tank 12 and this evaporator 13a. By heat exchange with the medium in the second circuit C2 connected to the evaporator 13a, the working medium of the third heat pump absorbs heat energy via the evaporator 13a. Work is added via the compressor 13c, whereby the pressure and the temperature of the working medium of the third heat pump is increased. In the condenser 13b, heat energy is then emitted to another medium by heat exchange and the working medium of the third heat pump is then returned to the evaporator 13a via the expansion valve 13d, the pressure and the temperature of the working medium being lowered when passing the expansion valve.

An electronic control device 14 is configured to control the circulation of medium between the first accumulator tank 12 and the evaporator 13a of the third heat pump in dependence on one or more predetermined control variables. In the illustrated embodiments, the electronic control device 14 is configured to control said circulation in dependence on a temperature value T1 representing the temperature of the medium flowing in the second circuit C2 from an outlet 15 of the first accumulator tank 12 in the direction towards the inlet 10a of the heat exchanger 10, wherein this temperature value T1 is established by means of a temperature sensor 16 which is connected to the electronic control device 14.

The heating installation 1 comprises a circulation pump 17 which is arranged in a conduit between the first accumulator tank 12 and the evaporator 13a of the third heat pump in order to achieve circulation of medium between the first accumulator tank 12 and the evaporator 13a of the third heat pump. In the illustrated embodiments, the electronic control device 14 is configured to control the circulation of medium between the first accumulator tank 12 and the evaporator 13a of the third heat pump by controlling this circulation pump 17.

The second circuit C2 comprises a feed conduit 18 which is connected to an inlet 13g of the evaporator 13a of the third heat pump and through which medium from the first accumulator tank 12 can be conveyed into the evaporator 13a of the third heat pump, and a return conduit 19 which is connected to an outlet 13h of the evaporator 13a of the third heat pump and through which medium can be conveyed back to the first accumulator tank 12 from the evaporator 13a of the third heat pump. In the embodiments illustrated in FIGS. 3-6, the second circuit C2 further comprises a shunt conduit 20, via which the return conduit 19 is connected to the feed conduit 18 in order to allow medium flowing via the feed conduit 18 from the first accumulator tank 12 in the direction towards said inlet 13g of the evaporator 13a of the third heat pump to be mixed with medium which is returned via the shunt conduit 20 from said outlet 13h to said inlet 13g of the evaporator 13a of the third heat pump. The mixing proportion between medium flowing from the first accumulator tank 12 through the feed conduit 18 and medium supplied to the feed conduit 18 from the shunt conduit 20 is regulated by means of a regulating valve 21. In the embodiments illustrated in FIGS. 3-6, the regulating valve 21 is arranged in the feed conduit 18, but it could alternatively be arranged in the return conduit 19. The regulating valve 21 is controlled by means of the electronic control device 14 in dependence on a temperature value T2 representing the temperature of the medium flowing into the evaporator 13a of the third heat pump via said inlet 13g and/or a temperature value T3 representing the temperature of the medium flowing out of the evaporator 13a of the third heat pump via said outlet 13h. These temperature values T2, T3 are established by means of temperature sensors 22, 23 which are connected to the electronic control device 14. By means of the regulating valve 21, the electronic control device 14 is capable of ensuring that the temperature of the medium flowing into the evaporator 13a of the third heat pump via the feed conduit 18 is kept at a desired level.

In the embodiments illustrated in FIGS. 1-3 and 6, the evaporator 11a of the second heat pump and the first accumulator tank 12 are arranged in the second circuit C2 in series with each other and in series with the heat exchanger 10.

Figure 4:
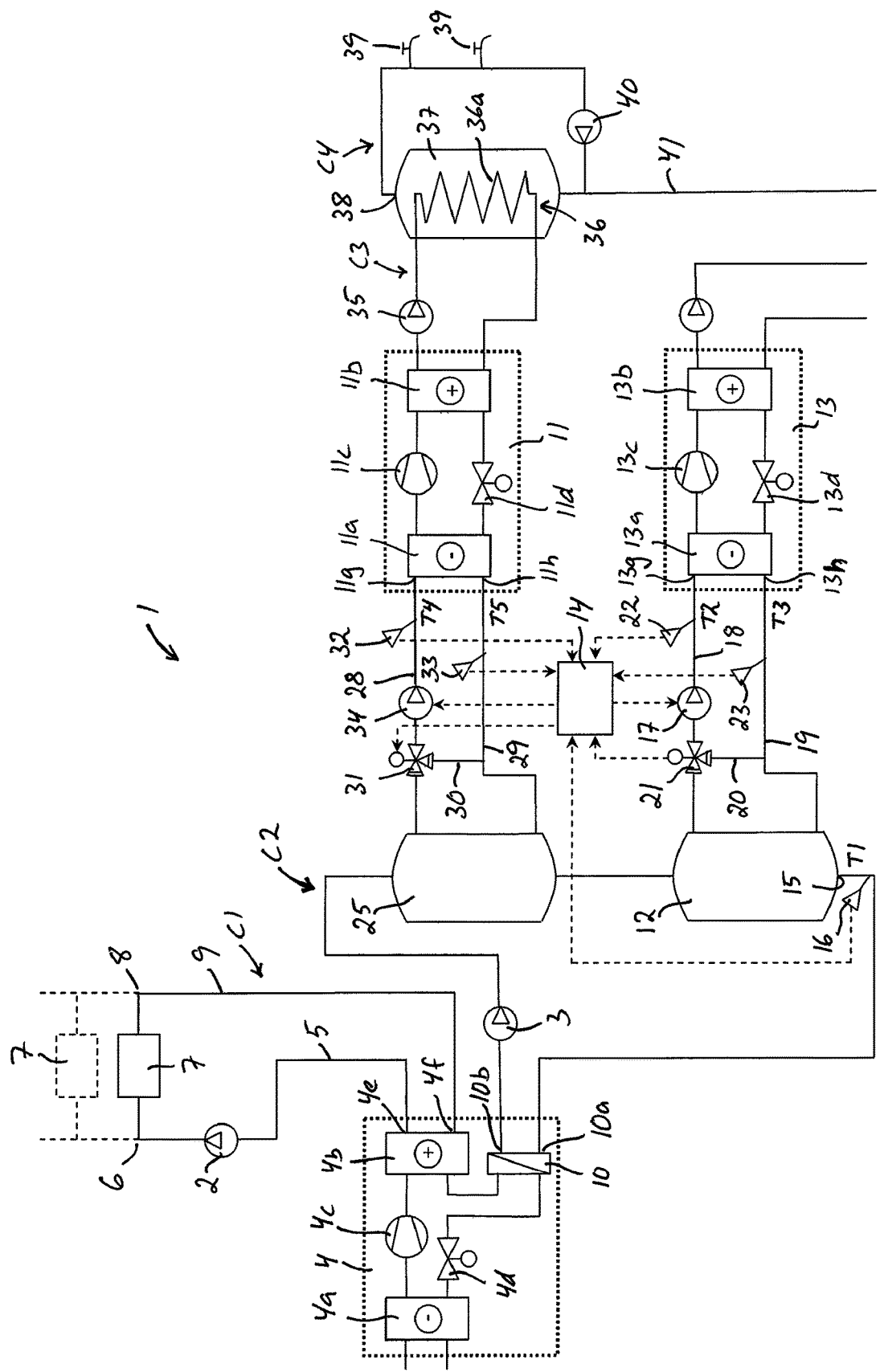
Figure 5:
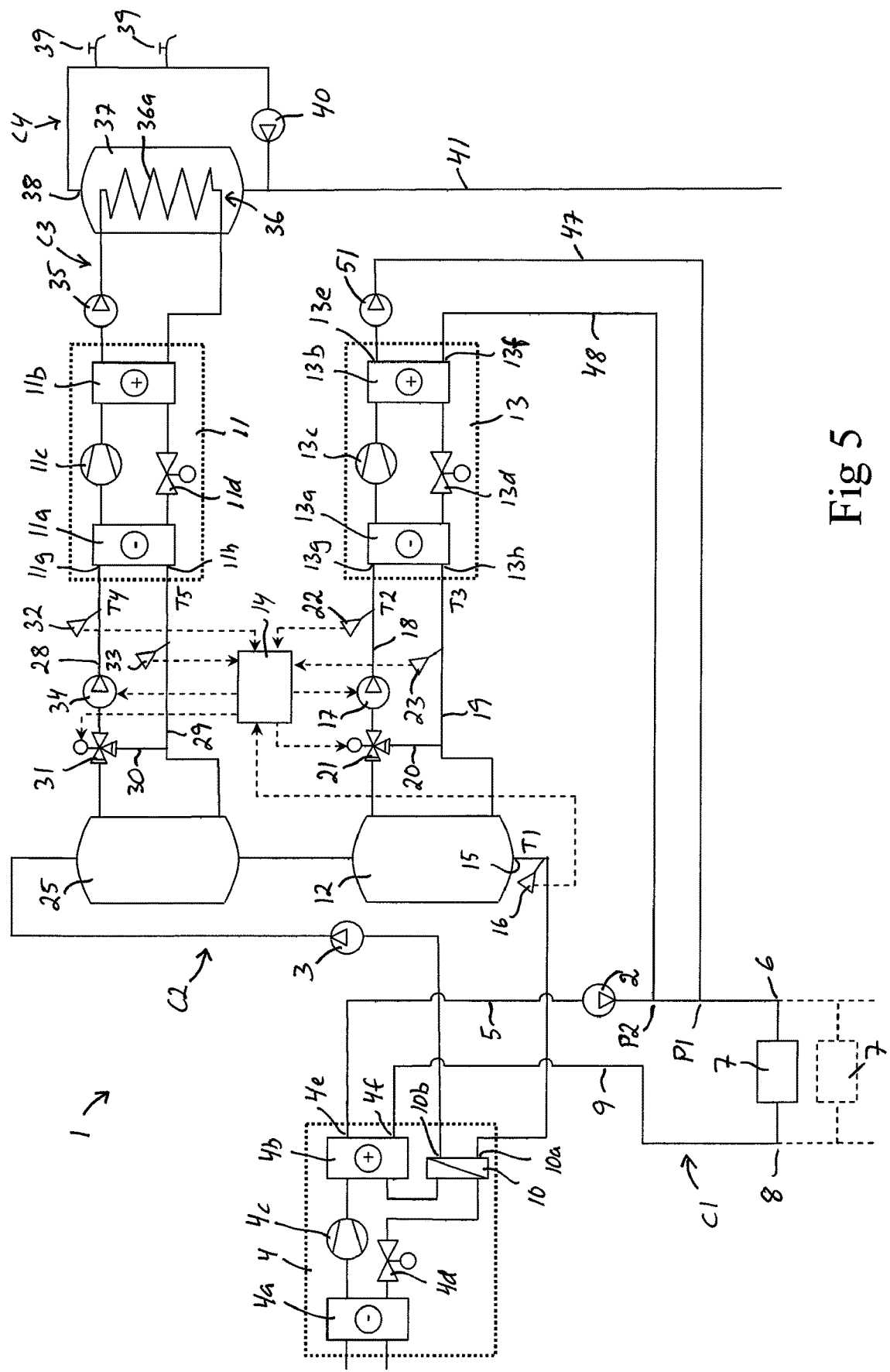

In the embodiments illustrated in FIGS. 4 and 5, a second accumulator tank 25 is also arranged in the second circuit C2 for accumulating the medium in the second circuit, wherein this second accumulator tank 25 is arranged in the second circuit C2 in series with an upstream of the first accumulator tank 12 as seen in the above-mentioned flow direction. The second accumulator tank 25 is connected to the second heat pump 11 in order to allow medium to circulate between the second accumulator tank 25 and the evaporator 11a of the second heat pump. The second circuit C2 comprises a feed conduit 28 which is connected to an inlet 11g of the evaporator 11a of the second heat pump and through which medium from the second accumulator tank 25 can be conveyed into the evaporator 11a of the second heat pump, and a return conduit 29 which is connected to an outlet 11h of the evaporator 11a of the second heat pump and through which medium can be conveyed back to the second accumulator tank 25 from the evaporator 11a of the second heat pump. The second circuit C2 further comprises a shunt conduit 30, via which the return conduit 29 is connected to the feed conduit 28 in order to allow medium flowing via the feed conduit 28 from the second accumulator tank 25 in the direction towards said inlet 11g of the evaporator 11a of the second heat pump to be mixed with medium which is returned via the shunt conduit 30 from said outlet 11h to said inlet 11g of the evaporator 11a of the second heat pump. The mixing proportion between medium flowing from the second accumulator tank 25 through the feed conduit 28 and medium supplied to the feed conduit 28 from the shunt conduit 30 is regulated by means of a regulating valve 31. In the embodiments illustrated in FIGS. 4 and 5, the regulating valve 31 is arranged in the feed conduit 28, but it could alternatively be arranged in the return conduit 29. The regulating valve 31 is controlled by means of the electronic control device 14 in dependence on a temperature value T4 representing the temperature of the medium flowing into the evaporator 11a of the second heat pump via said inlet 11g and/or a temperature value T5 representing the temperature of the medium flowing out of the evaporator 11a of the second heat pump via said outlet 11h. These temperature values T4, T5 are established by means of temperature sensors 32, 33 which are connected to the electronic control device 14. By means of the regulating valve 31, the electronic control device 14 is capable of ensuring that the temperature of the medium flowing into the evaporator 11a of the second heat pump via the feed conduit 28 is kept at a predetermined level.

The circulation of medium between the second accumulator tank 25 and the evaporator 11a of the second heat pump is achieved by means of a circulation pump 34, which in the embodiments illustrated in FIGS. 4 and 5 is arranged in the feed conduit 28. This circulation pump 34 could alternatively be arranged in the return conduit 29.

In the illustrated embodiments, the heating installation 1 comprises a third circuit C3, which contains a liquid medium, such as for instance water. A circulation pump 35 is arranged in the third circuit C3 for circulating the medium in this circuit. The second heat pump 11 has its output side connected to the third circuit C3 so that heat exchange between the working medium of the second heat pump 11 and the medium in the third circuit C3 is possible via the condenser 11b of the second heat pump. A heat emitting device 36 is arranged in the third circuit C3 for heating tap hot-water by transfer of heat from the medium in the third circuit C3 to water which is intended to be heated in order to provide tap hot-water. In the illustrated embodiments, the tap hot-water final-heated by the heat emitting device 36 is stored in an accumulator tank 37 in the following denominated third accumulator tank. Via a tap hot-water circuit C4, tap hot-water is conveyed from an outlet 38 of the third accumulator tank 37 to one or more tapping points 39, which for instance may be provided with hot-water taps. Tap hot-water that has passed the tapping points 39 without being tapped is conveyed back to the third accumulator tank 37. A circulation pump 40 is arranged in the tap hot-water circuit C4 for circulating the medium in this circuit. In the embodiments illustrated in FIGS. 1-5, no preheating of the tap hot-water takes place, and the third accumulator tank 37 is consequently arranged to receive cold water directly from a cold water supply line 41 in this case.

In the illustrated embodiments, the heat emitting device 36 comprises a heating coil 36a which is arranged in the third accumulator tank 37 and through which the medium in the third circuit C3 is allowed to flow in order to transfer heat from the medium in the third circuit C3 to the water in the third accumulator tank 37.

In the embodiment illustrated in FIG. 6, the heating installation 1 comprises a further heat exchanger 43, in the following denominated second heat exchanger, which is arranged in the second circuit C2 in order to transfer heat from the medium in the second circuit C2 to another medium. The second heat exchanger 43 is connected to the first accumulator tank 12 in order to allow medium to circulate between the first accumulator tank 12 and this heat exchanger 43. The circulation of medium between the first accumulator tank 12 and the second heat exchanger 43 is achieved by means of a circulation pump 44. In the illustrated example, the second heat exchanger 43 is connected to the water supply line 41 upstream of the third accumulator tank 37 and is consequently used for preheating the tap hot-water. The second heat exchanger 43 has a primary circuit which, via an inlet 45a and an outlet 45b of this primary circuit, is connected to the second circuit C2 in order to allow medium in the second circuit C2 to flow through the primary circuit, and a secondary circuit which, via an inlet 46a and an outlet 46b of this secondary circuit, is connected to the water supply line 41 in order to allow water in the water supply line 41 to flow through this secondary circuit.

Figure 6:
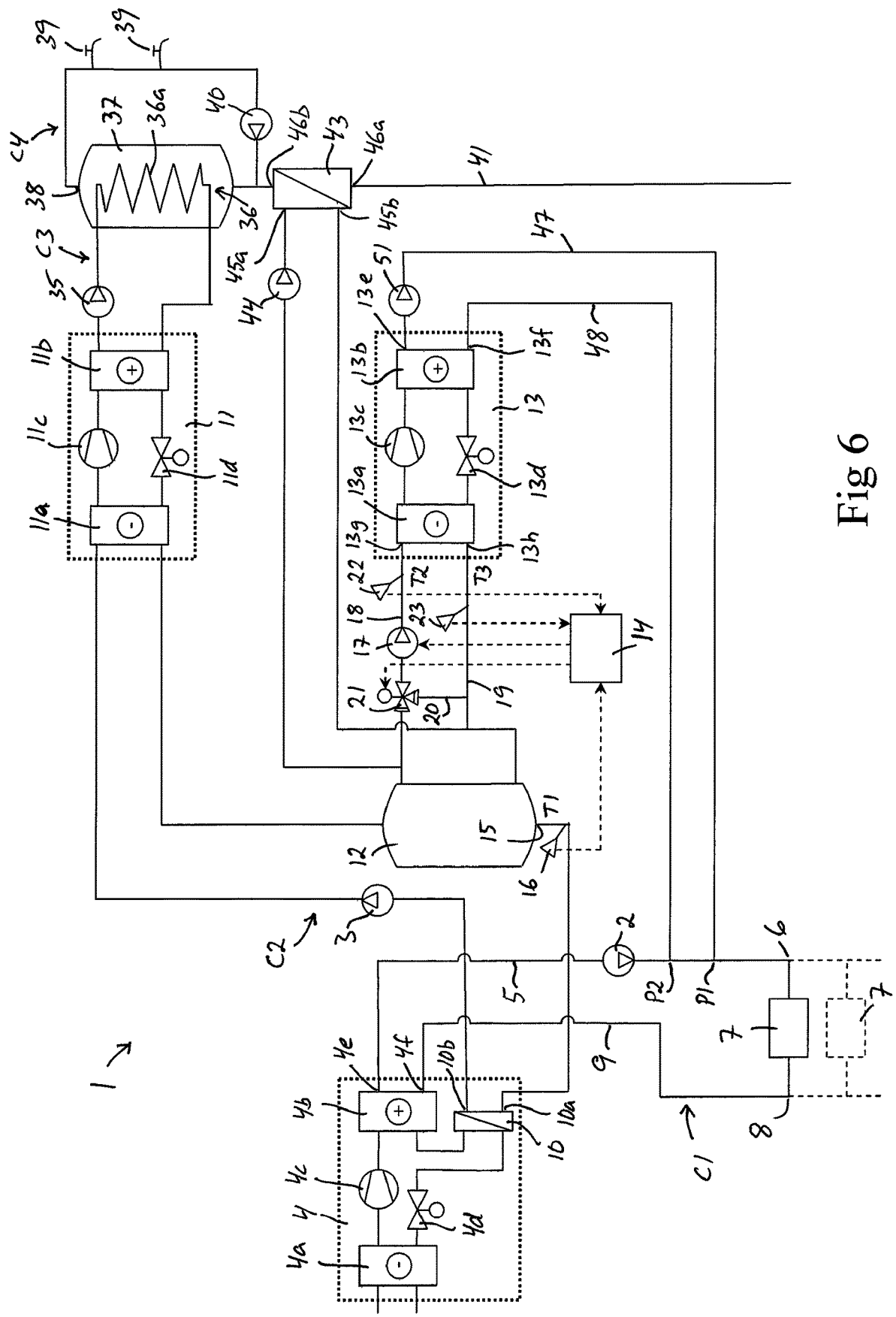

In the embodiments illustrated in FIGS. 5 and 6, the third heat pump 13 has its output side connected to the first circuit C1 so that heat exchange between the working medium of the third heat pump 13 and the medium in the first circuit C1 is possible via the condenser 13b of the third heat pump. In these embodiments, the third heat pump 13 is consequently arranged to utilize heat energy from the medium in the second circuit C2 in order to give an addition of heat to the medium in the first circuit C1 and thereby contribute to the heating of the air in the building in question via the heat emitting devices 7 arranged in the first circuit C1. An outlet 13e of the condenser 13b of the third heat pump is connected to the first circuit C1 via a first connecting conduit 47, and an inlet 13f of the condenser 13b of the third heat pump is connected to the first circuit C1 via a second connecting conduit 48. Medium may flow from the first circuit C1 to the condenser 13b of the third heat pump via the second connecting conduit 48, through the condenser 13b of the third heat pump while absorbing heat from the working medium of the third heat pump 13, and then back to the first circuit C1 via the first connecting conduit 47. In the embodiments illustrated in FIGS. 5 and 6, the first connecting conduit 47 is connected to the first circuit C1 at a first point P1 located in the feeding conduit 5, whereas the second connecting conduit 48 is connected to the first circuit C1 at a second point P2 located in the feeding conduit 5 upstream of said first point P1. A circulation pump 51 is arranged in the first connecting conduit 47. This circulation pump 51 could alternatively be arranged in the second connecting conduit 48.

Figure 2:
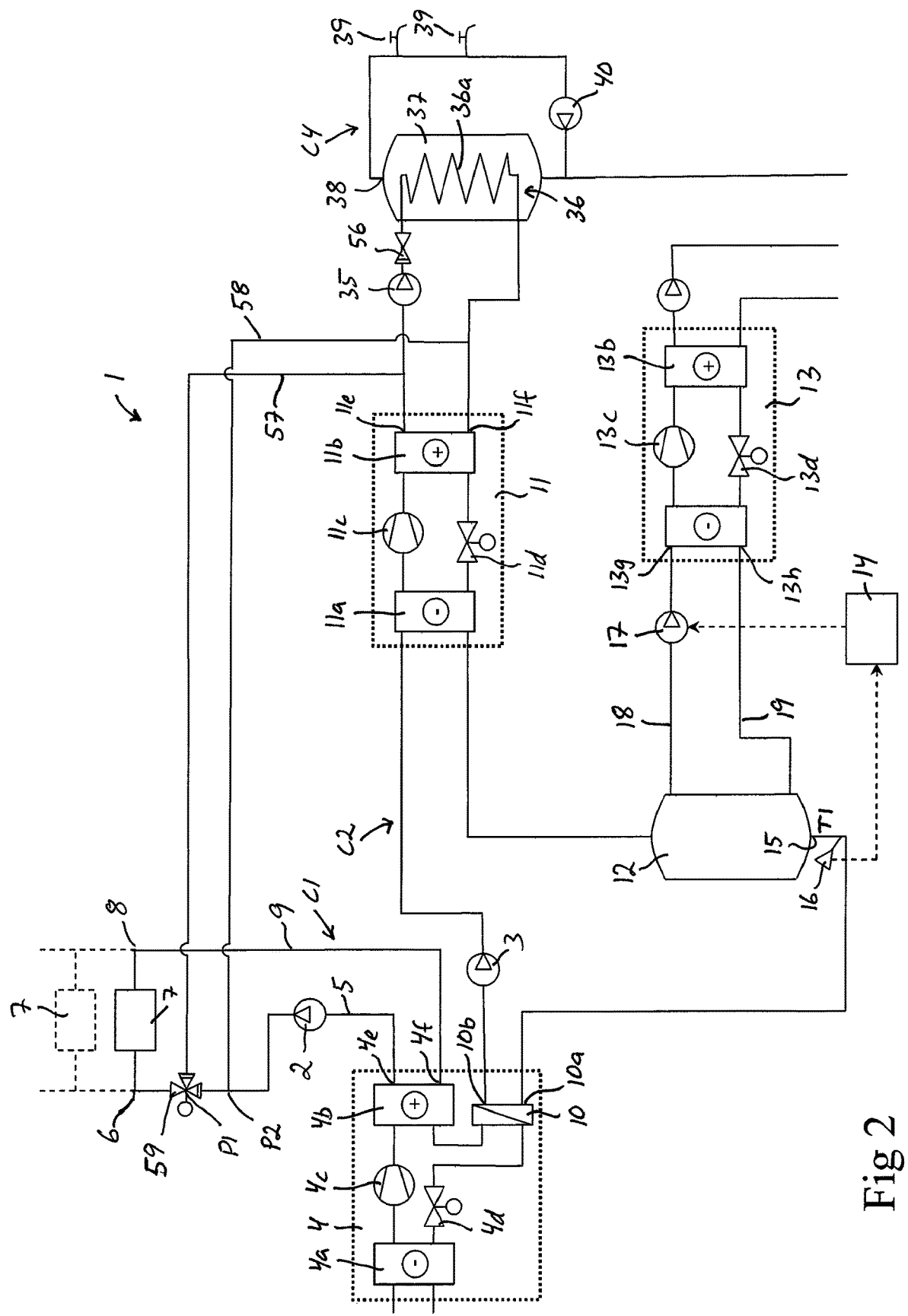
Figure 3:
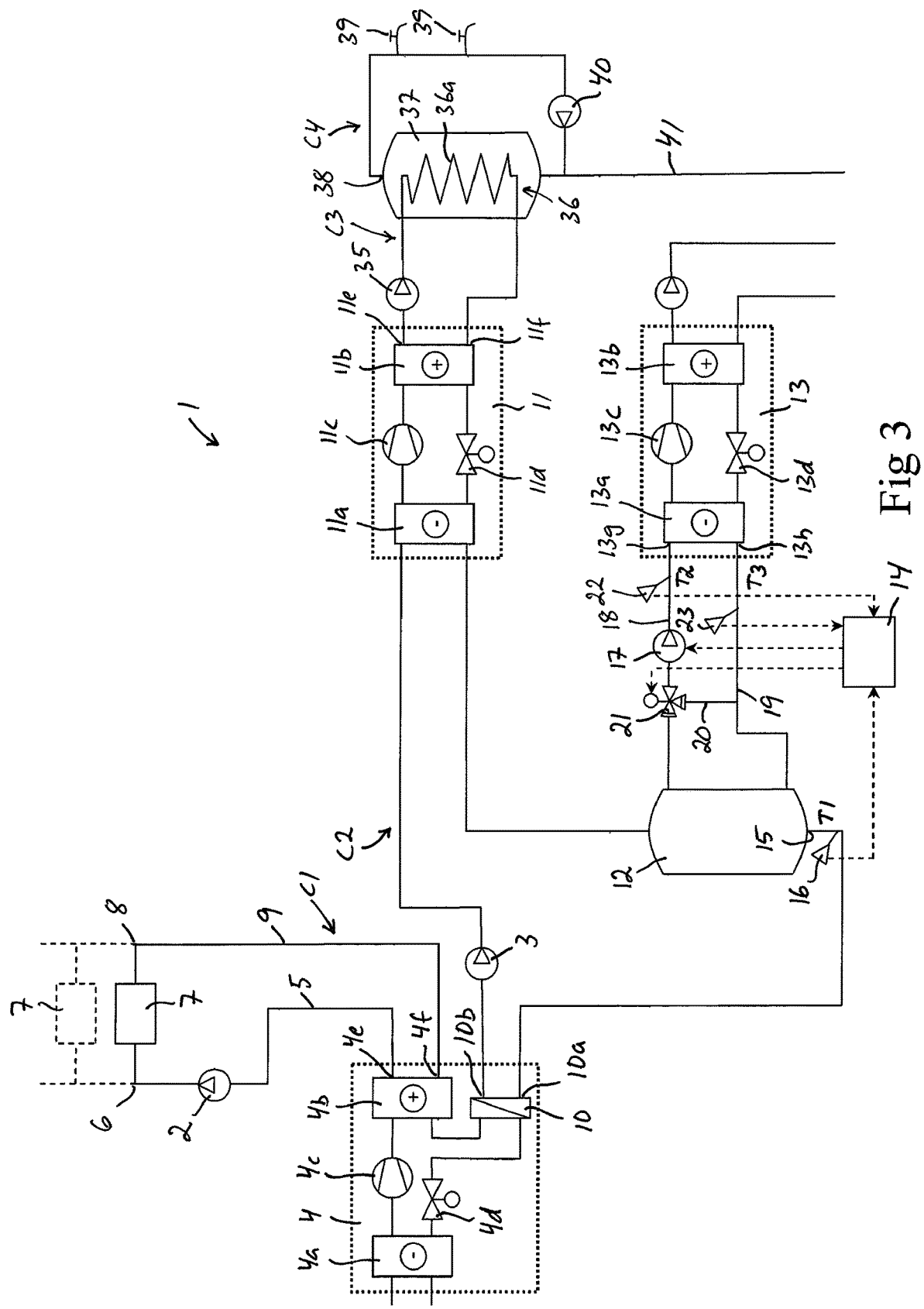

In the embodiment illustrated in FIG. 2, the second heat pump 11 has its output side connected to the first circuit C1 so that heat exchange between the working medium of the second heat pump 11 and the medium in the first circuit C1 is possible via the condenser 11b of the second heat pump. In this embodiment, the second heat pump 11 is consequently arranged to utilize heat energy from the medium in the second circuit C2 in order to give an addition of heat to the medium in the first circuit C1 and thereby contribute to the heating of the air in the building in question via the heat emitting devices 7 arranged in the first circuit C1. An outlet 11e of the condenser 11b of the second heat pump is connected to the first circuit C1 via a first connecting conduit 57, and an inlet 11f of the condenser 11b of the second heat pump is connected to the first circuit C1 via a second connecting conduit 58. Medium may flow from the first circuit C1 to the condenser 11b of the second heat pump via the second connecting conduit 58, through the condenser 11b of the second heat pump while absorbing heat from the working medium of the second heat pump 11, and then back to the first circuit C1 via the first connecting conduit 57. In the illustrated example, the first connecting conduit 57 is connected to the first circuit C1 at a first point P1 located in the feeding conduit 5, whereas the second connecting conduit 58 is connected to the first circuit C1 at a second point P2 located in the feeding conduit 5 upstream of said first point P1. In the illustrated example, the first connecting conduit 57 is connected to the first circuit C1 via a regulating valve 59, by means of which the flow through the connecting conduits 57, 58 can be regulated. This regulating valve 59 is consequently arranged at said first point P1. Furthermore, in the embodiment illustrated in FIG. 2, a non-return valve 56 is arranged in the third circuit C3.

The invention is of course not in any way limited to the embodiments described above. On the contrary, many possibilities to modifications thereof should be apparent to a person skilled in the art without thereby deviating from the basic idea of the invention as defined in the appended claims.

The invention claimed is:

1. A heating installation comprising:
   a first circuit (C1) containing a medium;
   a second circuit (C2) containing a medium;
   a first heat pump (4) arranged for heating the medium in the first circuit (C1);
   a heat exchanger (10) which is arranged in the second circuit (C2) and which is connected between a condenser (4b) and an expansion valve (4d) of the first heat pump (4) to transfer heat from a working medium of the first heat pump (4) to the medium in the second circuit (C2); and
   a second heat pump (11) arranged for heating a medium by absorbing heat energy from the medium in the second circuit (C2), wherein
   the second heat pump (11) has its input side connected to the second circuit (C2) so that heat exchange between the medium in the second circuit (C2) and a working medium of the second heat pump (11) is possible via an evaporator (11a) of the second heat pump (11);
   an accumulator tank (12), here denominated first accumulator tank, which is arranged in the second circuit (C2) for accumulating the medium in the second circuit;
   this accumulator tank (12) is arranged in the second circuit (C2) downstream of the second heat pump (11) as seen in a flow direction from an outlet (10b) of said heat exchanger (10) to an inlet (10a) thereof;
   the heating installation (1) comprises a third heat pump (13) arranged for heating a medium by absorbing heat energy from the medium in the second circuit (C2);
   the first accumulator tank (12) is connected to an evaporator (13a) of the third heat pump (13) to allow medium to circulate between the first accumulator tank (12) and the evaporator (13a) of the third heat pump so that heat exchange between the medium in the second circuit (C2) and a working medium of the third heat pump (13) is possible via the evaporator (13a) of the third heat pump;
   the heating installation comprises an electronic control device (14) which is configured to control the circulation of medium between the first accumulator tank (12) and the evaporator (13a) of the third heat pump in dependence on one or more predetermined control variables;
   said one or more control variables comprise a temperature value (T1) representing the temperature of the medium flowing in the second circuit (C2) from an outlet (15)

of the first accumulator tank (12) in the direction towards said inlet (10a) of said heat exchanger (10);

the heating installation (1) comprises a temperature sensor (16) which is connected to the electronic control device (14) and configured to establish this temperature value (T1);

the heating installation (1) comprises a circulation pump (17) which is arranged in a conduit between the first accumulator tank (12) and the evaporator (13a) of the third heat puma;

the electronic control device (14) is configured to control the circulation of medium between the first accumulator tank (12) and the evaporator (13a) of the third heat pump by controlling this circulation pump (17);

the second circuit (C2) comprises a feed conduit (18) which is connected to an inlet (13g) of the evaporator (13a) of the third heat pump and through which medium from the first accumulator tank (12) can be conveyed into the evaporator (13a) of the third heat pump, and a return conduit (19) which is connected to an outlet (13h) of the evaporator (13a) of the third heat pump and through which medium can be conveyed back to the first accumulator tank (12) from the evaporator (13a) of the third heat pump;

the second circuit (C2) comprises a shunt conduit (20), via which said return conduit (19) is connected to said feed conduit (18) to allow medium flowing from the first accumulator tank (12) in the direction towards said inlet (13g) of the evaporator (13a) of the third heat pump to be mixed with medium which is returned via the shunt conduit (20) from said outlet (13h) to said inlet (13g) of the evaporator (13a) of the third heat pump;

the heating installation (1) comprises a regulating valve (21) for regulating the mixing proportion between medium flowing from the first accumulator tank (12) in the direction towards said inlet (13g) of the evaporator (13a) of the third heat pump and medium which is returned via said shunt conduit (20) from said outlet (13h) to said inlet (13g) of the evaporator (13a) of the third heat pump; and the electronic control device (14) is configured to control said regulating valve (21) in dependence on a temperature value (T2) representing the temperature of the medium flowing into the evaporator (13a) of the third heat pump via said inlet (13g) and/or a temperature value (T3) representing the temperature of the medium flowing out of the evaporator (13a) of the third heat pump via said outlet (13h).

2. A heating installation according to claim 1, wherein the evaporator (11a) of the second heat pump and the first accumulator tank (12) are arranged in the second circuit (C2) in series with each other and in series with said heat exchanger (10).

3. A heating installation according to claim 1, wherein the heating installation (1) comprises a second accumulator tank (25) arranged in the second circuit (C2) for accumulating the medium in the second circuit;

this second accumulator tank (25) is arranged in the second circuit (C2) in series with and upstream of the first accumulator tank (12) as seen in said flow direction; and the second accumulator tank (25) is connected to the second heat pump (11) to allow medium to circulate between the second accumulator tank (25) and the evaporator (11a) of the second heat pump.

4. A heating installation according to claim 1, wherein the heating installation (1) comprises one or more heat emitting devices (7) which are arranged in the first circuit (C1) to transfer heat from the medium in the first circuit (C1) to air within a building.

5. A heating installation according to claim 4, wherein the third heat pump (13) has its output side connected to the first circuit (C1) so that heat exchange between the working medium of the third heat pump (13) and the medium in the first circuit (C1) is possible via a condenser (13b) of the third heat pump (13).

6. A heating installation according to claim 4, wherein the second heat pump (11) has its output side connected to the first circuit (C1) so that heat exchange between the working medium of the second heat pump (11) and the medium in the first circuit (C1) is possible via a condenser (11b) of the second heat pump (11).

7. A heating installation according to claim 1, wherein
the heating installation (1) comprises a third circuit (C3) containing a medium;
the second heat pump (11) has its output side connected to the third circuit (C3) so that heat exchange between the working medium of the second heat pump (11) and the medium in the third circuit (C3) is possible via a condenser (11b) of the second heat pump (11); and
the heating installation (1) comprises a heat emitting device (36) which is arranged in the third circuit (C3) for heating tap hot-water by transferring heat from the medium in the third circuit (C3) to water which is intended to be heated in order to provide tap hot-water.

8. A heating installation according to claim 7, wherein the heating installation (1) comprises a third accumulator tank (37) for accumulating the tap hot-water heated by said heat emitting device (36).

9. A heating installation according to claim 8, wherein said heat emitting device (36) comprises a heating coil (36a) which is arranged in third accumulator tank (37) and through which the medium in the third circuit (C3) is allowed to flow to transfer heat from the medium in the third circuit (C3) to the water in the third accumulator tank (37).

10. A heating installation according to claim 1, wherein
the heating installation (1) comprises a further heat exchanger (43) which is arranged in the second circuit (C2) to transfer heat from the medium in the second circuit (C2) to another medium; and
this further heat exchanger (43) is connected to the first accumulator tank (12) to allow medium to circulate between the first accumulator tank (12) and this heat exchanger (43).

11. A heating installation according to claim 10, wherein said further heat exchanger (43) is arranged to preheat tap hot-water by transferring heat from the medium in the second circuit (C2) to water in a water supply line (41).

12. A heating installation comprising:
a first circuit (C1) containing a medium;
a second circuit (C2) containing a medium;
a first heat pump (4) arranged for heating the medium in the first circuit (C1);
a heat exchanger (10) which is arranged in the second circuit (C2) and which is connected between a condenser (4b) and an expansion valve (4d) of the first heat pump (4) to transfer heat from a working medium of the first heat pump (4) to the medium in the second circuit (C2); and
a second heat pump (11) arranged for heating a medium by absorbing heat energy from the medium in the second circuit (C2), wherein the second heat DUMP (11) has its input side connected to the second circuit (C2) so that heat exchange between the medium in the second circuit (C2) and a working medium of the second heat pump (11) is possible via an evaporator (11a) of the second heat pump (11);

an accumulator tank (12), here denominated first accumulator tank, which is arranged in the second circuit (C2) for accumulating the medium in the second circuit;

this accumulator tank (12) is arranged in the second circuit (C2) downstream of the second heat pump (11) as seen in a flow direction from an outlet (10b) of said heat exchanger (10) to an inlet (10a) thereof;

the heating installation (1) comprises a third heat pump (13) arranged for heating a medium by absorbing heat energy from the medium in the second circuit (C2);

the first accumulator tank (12) is connected to an evaporator (13a) of the third heat pump (13) to allow medium to circulate between the first accumulator tank (12) and the evaporator (13a) of the third heat pump so that heat exchange between the medium in the second circuit (C2) and a working medium of the third heat pump (13) is possible via the evaporator (13a) of the third heat pump;

the heating installation (1) comprises a second accumulator tank (25) arranged in the second circuit (C2) for accumulating the medium in the second circuit;

this second accumulator tank (25) is arranged in the second circuit (C2) in series with and upstream of the first accumulator tank (12) as seen in said flow direction;

the second accumulator tank (25) is connected to the second heat pump (11) to allow medium to circulate between the second accumulator tank (25) and the evaporator (11a) of the second heat pump;

the second circuit (C2) comprises a feed conduit (28) which is connected to an inlet (11g) of the evaporator (11a) of the second heat pump and through which medium from the second accumulator tank (25) can be conveyed into the evaporator (11a) of the second heat pump, and a return conduit (29) which is connected to an outlet (11h) of the evaporator (11a) of the second heat pump and through which medium can be conveyed back to the second accumulator tank (25) from the evaporator (11a) of the second heat pump;

the second circuit (C2) comprises a shunt conduit (30), via which the last-mentioned return conduit (29) is connected to the last-mentioned feed conduit (28) to allow medium flowing from the second accumulator tank (25) in the direction towards said inlet (11g) of the evaporator (11a) of the second heat pump to be mixed with medium which is returned via the shunt conduit (30) from said outlet (11h) to said inlet (11g) of the evaporator (11a) of the second heat pump;

the heating installation (1) comprises a regulating valve (31) for regulating the mixing proportion between medium flowing from the second accumulator tank (25) in the direction towards said inlet (11g) of the evaporator (11a) of the second heat pump and medium which is returned via said shunt conduit (30) from said outlet (11h) to said inlet (11g) of the evaporator (11a) of the second heat pump; and an electronic control device (14) is configured to control said regulating valve (31) in dependence on a temperature value (T4) representing the temperature of the medium flowing into the evaporator (11a) of the second heat pump via said inlet (11g) and/or a temperature value (T5) representing the temperature of the medium flowing out of the evaporator (11a) of the second heat pump via said outlet (11h).

13. A heating installation according to claim 12, wherein the heating installation comprises an electronic control device (14) which is configured to control the circulation of medium between the first accumulator tank (12) and the evaporator (13a) of the third heat pump in dependence on one or more predetermined control variables;

said one or more control variables comprise a temperature value (T1) representing the temperature of the medium flowing in the second circuit (C2) from an outlet (15) of the first accumulator tank (12) in the direction towards said inlet (10a) of said heat exchanger (10); and the heating installation (1) comprises a temperature sensor (16) which is connected to the electronic control device (14) and configured to establish this temperature value (T1).

14. A heating installation according to claim 13, wherein the heating installation (1) comprises a circulation pump (17) which is arranged in a conduit between the first accumulator tank (12) and the evaporator (13a) of the third heat pump; and the electronic control device (14) is configured to control the circulation of medium between the first accumulator tank (12) and the evaporator (13a) of the third heat pump by controlling this circulation pump (17).

* * * * *

UNITED STATES PATENT AND TRADEMARK OFFICE
CERTIFICATE OF CORRECTION

PATENT NO. : 10,612,796 B2
APPLICATION NO. : 15/524917
DATED : April 7, 2020
INVENTOR(S) : Hans-Göran Göransson It is certified that error appears in the above-identified patent and that said Letters Patent is hereby corrected as shown below:

In the Claims

Column 11, Line 1, change "DUMP" to --pump-- in Claim 12.

Signed and Sealed this
Sixteenth Day of June, 2020

Andrei Iancu
*Director of the United States Patent and Trademark Office*